United States Patent
Väänänen

(10) Patent No.: US 6,345,089 B1
(45) Date of Patent: Feb. 5, 2002

(54) METHOD FOR CALL SET-UP AND A TELECOMMUNICATION SYSTEM

(76) Inventor: Mikko Väänänen, Kannuskatu 3 J, Fin-20280 Turku (FI)

(*) Notice: Subject to any disclaimer, the term of this patent is extended or adjusted under 35 U.S.C. 154(b) by 0 days.

(21) Appl. No.: 09/117,880
(22) PCT Filed: Feb. 7, 1997
(86) PCT No.: PCT/FI97/00081
  § 371 Date: Aug. 7, 1998
  § 102(e) Date: Aug. 7, 1998
(87) PCT Pub. No.: WO97/29598
  PCT Pub. Date: Aug. 14, 1997

(30) Foreign Application Priority Data

Feb. 9, 1996 (FI) .................................................. 960613

(51) Int. Cl.[7] ............................................. H04M 15/00
(52) U.S. Cl. ........................... 379/114.02; 379/114.06; 379/114.07; 379/114.08; 379/114.09
(58) Field of Search ................................. 379/130, 131, 379/112, 114, 220, 221, 115, 126, 120, 121, 114.02, 114.03, 114.06, 114.07, 114.08, 114.09

(56) References Cited

U.S. PATENT DOCUMENTS

| 5,473,630 A | 12/1995 | Penzias et al. .............. 375/114 |
| 5,570,417 A | 10/1996 | Byers .......................... 379/115 |
| 5,790,642 A * | 8/1998 | Taylor et al. ................ 379/114 |
| 5,799,072 A * | 8/1998 | Vulcan et al. ............... 379/114 |
| 5,881,139 A * | 8/1998 | Romines ...................... 379/114 |
| 5,878,122 A * | 3/1999 | White et al. ................. 379/115 |

FOREIGN PATENT DOCUMENTS

| WO | 9428683 | 12/1994 |

* cited by examiner

Primary Examiner—Curtis Kuntz
Assistant Examiner—Rexford N. Barnie
(74) Attorney, Agent, or Firm—Ladas and Parry

(57) ABSTRACT

The invention relates to a method for call set-up and a telecommunication system. The telecommunication system comprises service database means (10, 20, 30 and 40) comprising teleservice price data. The service database means (10, 20, 30 and 40) are connected to different service provider means (15 to 17, 25, 26, 35, 45, 46) representing various operators. A control means (11, 12, 21 to 23, 31 to 33, 41 and 42) is in connection with the subscriber terminal of the telecommunication system, and is regularly, or at a preferred time, in connection with the service database means (10, 20, 30 and 40) for transmission of service information to the control means (11, 12, 21 to 23, 31 to 33, 41 and 42). The control means (11, 12, 21 to 23, 31 to 33, 41 and 42) controls the call set-up of the subscriber terminal so that the subscriber uses the operator (15–17, 25, 26, 35, 45, 46) offering the most inexpensive teleservice. To further increase the efficiency, the service database means (10, 20, 30 and 40) form their own service areas, which are connected to each other as a network.

15 Claims, 3 Drawing Sheets

METHOD FOR CALL SET-UP AND A TELECOMMUNICATION SYSTEM

TECHNICAL FIELD

The invention relates to a method for call set-up in a telecommunication system comprising a plurality of subscriber terminals, a plurality of service provider means, at least one service database means for storing service information received from the service provider means, and a telecommunications network via which calls are established in the system.

The invention also relates to a method for call set-up in a telecommunication system comprising a plurality of subscriber terminals, a plurality of service provider means, several service database means for storing service information received from the service provider means, and a telecommunications network via which calls are established in the system.

The invention further relates to a telecommunication system comprising a plurality of subscriber terminals, a plurality of service provider means, several service database means, and a telecommunications network via which calls are arranged to be established in the system.

PRIOR ART

Competition between suppliers of teleservices has caused significant differences in the prices of long distance calls in particular. Each operator attempts to offer the most competitive service, but usually on different grounds. Prices are affected by e.g. the duration of the call, the time of the day and the day of the week.

In known solutions, the suppliers of teleservices give price data to subscribers, who themselves have to choose manually the operator and the network they will use, and thus the price of the service. Another alternative is for the subscriber to make an agreement with an operator, resulting in all the calls being established via that operator and the network concerned.

In a prior art solution the subscriber can also use an additional device connected to the phone for making polling calls to several different operators or an operator service device, for example to check the service prices before actual call set-up. After the polling, the additional device chooses the operator/network offering the lowest price. This solution is described in more detail in the publication WO 94/28683, which is included as a reference herein.

However, prior art solutions involve disadvantages. It is difficult for a subscriber to know which operator offers the most inexpensive service at each particular moment. By making an agreement with an operator, the subscriber easily loses the benefit of price competition between operators.

Polling calls cost and congest the telecommunications network, and furthermore the use of an additional device for making a polling call increases the duration of the call or completely prevents it, as polling calls are typically made immediately before the actual call. Operators may also recognise the polling subscriber on the basis of the polling call. Furthermore, service information is not provided by an independent source, but instead by the service provider itself.

SUMMARY OF THE INVENTION

It is an object of the present invention to provide a method for eliminating inconveniently timed and congesting polling calls to different operators. In addition, the subscriber preserves his/her anonymity while checking price and other service information of different operators, and the price data for the operators originate from independent sources.

This is achieved with a method described in the introduction, which is characterized in that a service database means is in connection with service provider means and stores service information received via the connection, the service information stored in the service database means is periodically transmitted to a control means in connection with a subscriber terminal, and the control means in connection with the subscriber terminal stores the service information received from the service database means, and the service information stored in the control means is used in controlling call set-up from the subscriber terminal.

A method conforming with the invention is also characterized in that a service database means is in connection with other service database means and with service provider means, and stores the service information received via the connection, the service information stored in the service database means is periodically transferred to a control means in connection with a subscriber terminal, and the control means in connection with the subscriber terminal stores the service information received from the service database means, and the services information stored in the control means is used in controlling call set-up from the subscriber terminal.

A telecommunication system conforming with the invention is characterized in that the telecommunication system comprises service database means whose connections with each other form a network, the service database means are arranged to be in connection with service provider means, a control means in connection with a subscriber terminal is arranged to be periodically in connection with the service database means for transmission of service information, and the control means is arranged to control call set-up of the subscriber terminal on the basis of the service information.

The method of the invention offers significant advantages. A subscriber is more aware of the teleservices and is able to choose the most inexpensive or the most reliable operator for message switching.

DESCRIPTION OF THE DRAWINGS

In the following the invention will be described in greater detail with reference to examples in accordance with the accompanying drawings, in which.

DESCRIPTION OF THE PREFERRED EMBODIMENTS

Figure 1:
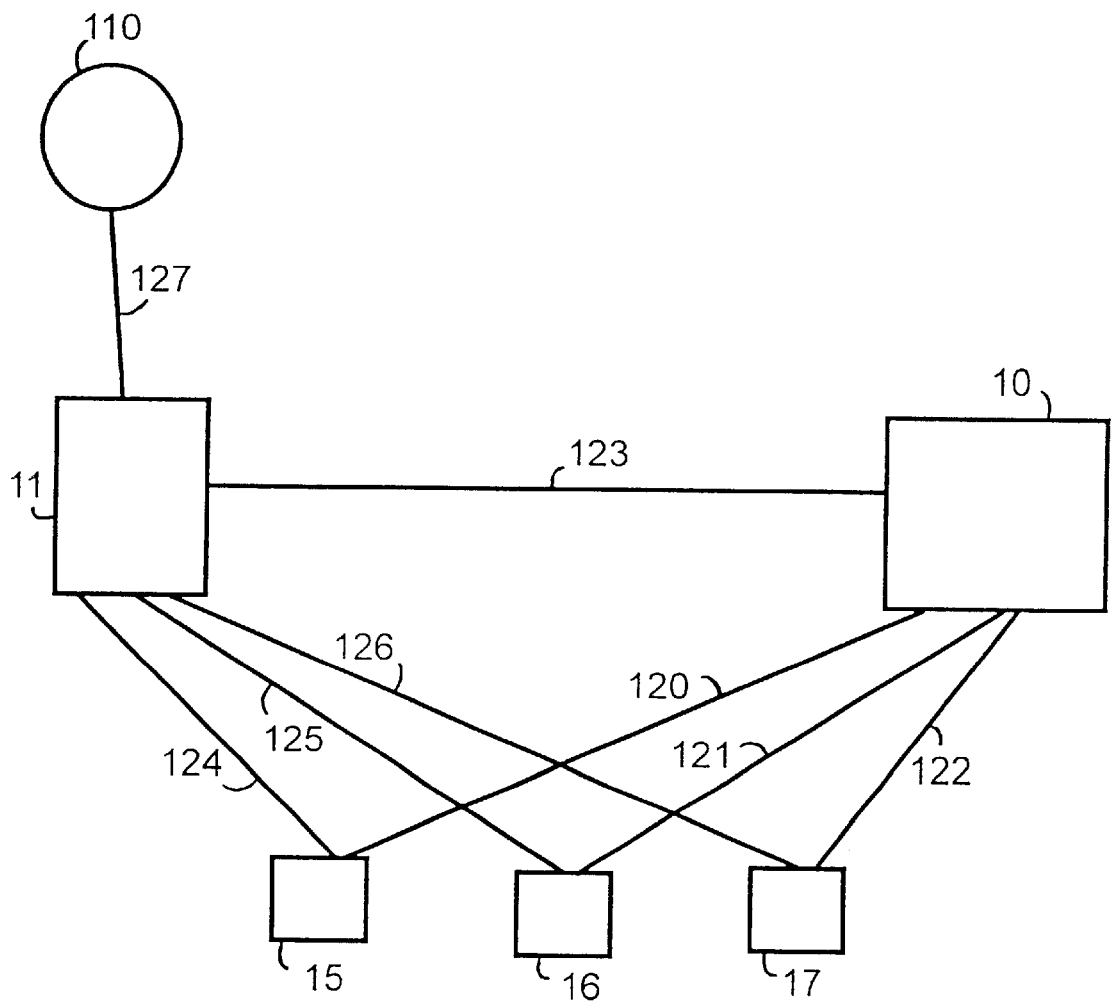
FIG. 1 shows the operation of a telecommunication system on a small scale.

FIG. 1 shows the near-by area of a telecommunication system related to a subscriber. This area of the telecommunication system comprises a service database means 10, a subscriber terminal 110, a control means 11 in connection with the subscriber terminal, and service provider means 15, 16 and 17.

Figure 2:
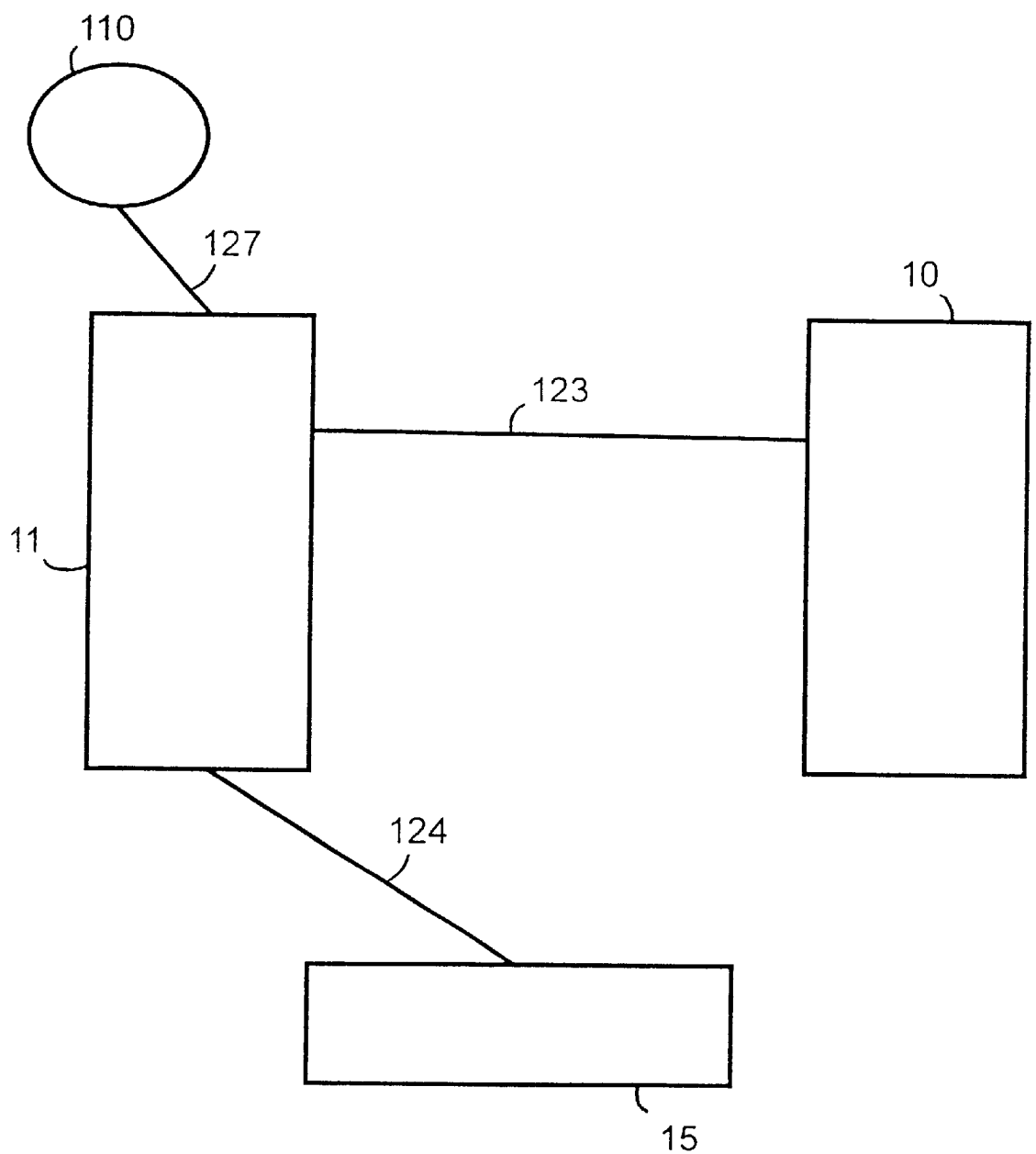
FIG. 2 shows the operation of a control means in connection with a subscriber terminal.

FIG. 2 also shows the near-by area of a telecommunication system. The telecommunication system comprises a service database means 10, a subscriber terminal 110, a control means 11 in connection with the subscriber terminal, and a service provider means 15.

Figure 3:
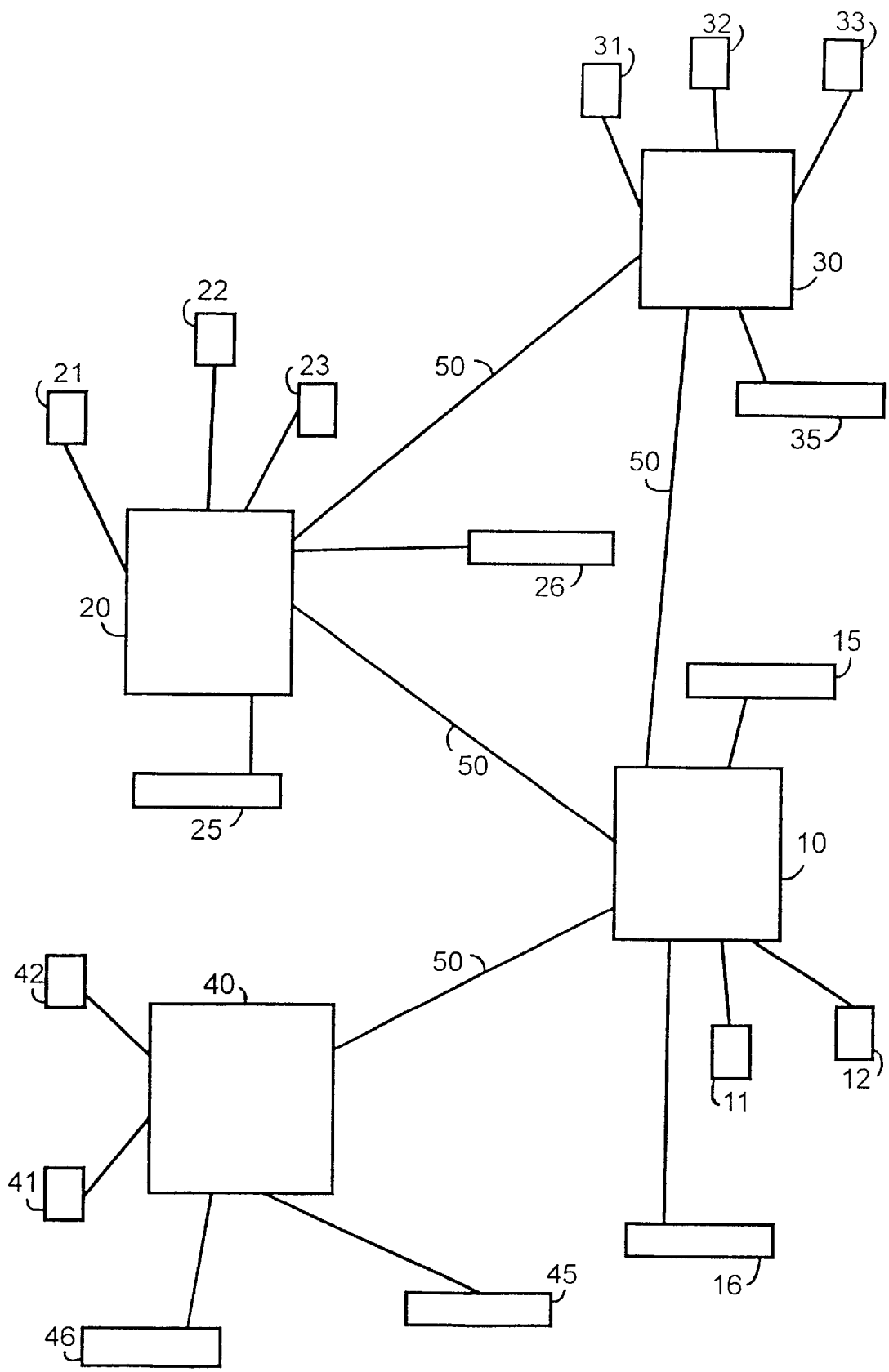
FIG. 3 shows the operation of a telecommunication system on a large scale.

FIG. 3 shows the telecommunication system of the invention on a large scale. The system comprises a plurality of service database means 10, 20, 30 and 40. Control means 11 and 12, and service provider means 15, 16, and 17 in connection with the subscriber terminal are in connection with the service database means 10. Control means 21, 22, and 23, and service provider means 25 and 26 in connection with the subscriber terminal are in connection with the service database means 20. Control means 31, 32, 33, and service provider means 35 in connection with the subscriber terminal are in connection with the service database means 30. Control means 41 and 42, and service provider means 45 and 46 in connection with the subscriber terminal are in connection with the service database means 40.

Let us observe the solution of the invention by means of FIG. 1. The service database means 10 is in connection with the service provider means 15, 16 and 17 via connections 120, 121 and 122 and stores the service information. The service information especially comprises price data for the telephone connection related to the operator, indicating the cost of call set-up and the cost per unit of time employed by each operator. In addition to price data, other data may also be included, such as the traffic load of the operator, call set-up being more reliable via an operator having a smaller traffic load, even though the operator may have higher time charging.

A service database means 10 conforming with the inventive solution preferably comprises a digital memory for storing service information of the operators 15, 16 and 17. The memory can be any known type of memory, preferably with changeable content, whose operation is based on optic, electric or magnetic storage. Such solutions include e.g. CD (Compact Disc), RAM (Random Access Memory) and hard disk storage. Further, the service database means preferably also comprises a memory and a processor controlling the operation of the service database means. The service provider means 15, 16 and 17 are ordinary telecommunications devices and equipment used by various operators to offer e.g. long distance teleservices and international teleservices. Data transmission can also take place via power lines of power companies, the lines being in two different uses allowing the company to provide competitive teleservices. The equipment of major international operators also comprises e.g. satellites and subsea or transcontinental cables for providing international calls. The connections 120, 121 and 122 are preferably digital transfer channels, implemented over the radio path or via a cable. This way the operators, represented by the service provider means 15, 16 and 17, are most preferably in a continues real time connection with the service database means 10 and perform real time update of the service information. The connections 120, 121 and 122 can even operate on an errand boy principle, the service information of the operators 15, 16 and 17 being manually transmitted to the service database means 10. Thus service information concerning the future can also be stored to the service database means 10.

The service information stored in the service database means 10 is periodically transmitted via a connection 123 to the control means 11 in connection with the subscriber terminal 110. The connection 123 preferably allows fast digital data transmission in digital or analogue form over the radio path or via a cable. Cable data transmission operates electrically or optically in accordance with prior art. Service information is transmitted preferably automatically to the control means 11 so that the service database means 10 establishes, either regularly or when service information is being updated, a connection with a subscriber who owns or controls a subscriber terminal 110 or a control means 11. Another alternative for data transmission is that the subscriber uses the subscriber terminal 110 and the control means 11 connected thereto to establish a connection with the service database means 10 by calling the number of a usual teleservice database means 10. This may of course be automated so that the subscriber only presses a button at his/her own subscriber terminal 110 and data transmission occurs automatically from there on.

In the solution of the invention it is important that the control means 11 is connected to the subscriber terminal, because only this way the subscriber can be aware of current teleservices price data and the market situation. The control means 11 in connection with the subscriber terminal stores the service information received from the service database means 10 and controls the subscriber terminal 110 call set-up by means of the stored service information. The control means 11 conforming with the inventive solution preferably comprises a digital memory where service information is stored. The memory can be any known type of memory, preferably with changeable contents, whose operation is based on optic, electric or magnetic storage. Such solutions include e.g. CD (Compact Disc), RAM (Random Access Memory) and hard disk storage. The control means 11 preferably also comprises a processor for controlling the operation.

When the service information of the service database means 10 has been transmitted to the control means 11 in connection with the subscriber terminal 110, the control means 11 can start to direct subscriber calls on the basis of the service information e.g. via the most competitive operator 15, 16 or 17. Thus, having received the service information, the control means 11 chooses the most inexpensive operator, say operator 15, for long distance calls and, say operator 16, for international calls. Thus, when a subscriber calls abroad, the control means 11 directs the call to operator 16. In addition to or as an alternative to the most competitive operator, service information may also comprise information on the quality of the connection, which the subscriber may find important. Especially when the service providers offer connections with different qualities, the control means 11 controls call set-up so that the transfer channel meets the quality requirements set by the signal or the user. The control can be effected e.g. so that the control means 11 shows the operator identification number or code to the subscriber for instance on a liquid crystal display (LCD) or the like. Another alternative is for the control means 11 to add the operator code to the number chosen by the subscriber, thus directing the call to said operator.

Let us now observe the operation of the control means 11 more closely by means of FIG. 2. In addition to the control means 11 receiving information from the service database means 10, the subscriber may also supply the control means 11 with special control information used in call set-up. This kind of information may include e.g. the estimated duration of the call or the required quality of the connection. Quality may refer to e.g. the signal-to-noise ratio or whether the transfer channel is digital or analogue. The subscriber transfers his/her own control information to the control means 11 using the subscriber terminal 110 via a connection 127 by means of e.g. a keyboard or verbally by using the subscriber terminal microphone, and in this case the control means 11 has to recognise speech. Because the control means 11 is in the proximity of the subscriber terminal 110 or attached to it, the connection 127 can be any conventional data transmission conductor between a main and a peripheral electronic unit or an optical link. During the call the control means 11 preferably warns if a previously set duration for the call is exceeded. A warning can also be given for excessively short calls. The control means 11 can also comprise a statistical call optimisation process, which keeps track of calls made by the subscriber. In this case, when the subscriber calls a given number, the control means 11 knows e.g. the expected duration of the call, based on which the control means 11 can suggest a certain operator or automatically choose an operator. Should the subscriber so wish, a variety of functions can be incorporated in the control means 11, as the processor-based implementation is easily adaptable.

Let us now view the telecommunication system of the invention with reference to FIG. 3. The service database means 10, 20, 30, and 40 form their own service areas, each comprising a plurality of subscriber terminals with control means and service provider means. For example the service area of the service database means 10 comprises subscriber terminals with control means 11 and 12, and service provider means 15 and 16 representing different operators. The invention is characterized in that the service database means 10, 20, 30 and 40 are connected to each other as a network and transmit service information to each other. This network connection 50 can operate via an existing telephone network, or the service database means 10, 20, 30 and 40 can be interconnected by their own network. In a preferred solution of the invention the control means 11 in connection with the subscriber terminal 110 can also be connected to the service database 10 via its own channel 123 (radio channel or cable), the connections between the service databases 10, 20, 30 and 40 and the control means 11, 12, 21–23, 31–33, 41 and 42 forming a network of their own. This way the control means 11 and the service database means 10 can preferably be in continuous real time connection with each other. Especially through their own network 50, the service database means 10, 20, 30 and 40 can stay in continuous real time connection with each other.

The information exchanged between the service database means 10, 20, 30 and 40 is dependent on the network connecting the service database means, and the data transmission capacity. In a small and/or large capacity network the service database means 10, 20, 30 and 40 may share all information with each other. However, if the network is large, it is typically not worth while to share all the information, because the majority of the information gathered by all service database means is irrelevant to one specific service database means. For this reason the service database means 10, 20, 30 and 40 may divide all service information e.g. into three categories on the basis of their use. The most important information comprises teleservice information A of the area of the service database means regarding calls outgoing from said area. The second category comprises service information B regarding calls incoming to or passing via the area of the service database. The third category comprises service information C not related to the service area of the service database means. The service database means 10, 20, 30, 40 transmits information A regarding all calls outgoing from its own area to control means in connection with subscriber terminals. The service database means 10, 20, 30 and 40 is arranged to gather all information A and B from the operators of its own area, and to preferably automatically transmit information B to the use of other service database means. Each service database means 10, 20, 30 and 40 is preferably arranged to share all service information with all of the other service database means 10, 20, 30 and 40. The service database means 10, 20, 30 and 40 may also preferably process received statistical information to a form more easily used by the control means 11, 12, 21–23, 31 33, 41 and 42. Such data processing comprises e.g. transformation of statistical price data into a function, where the duration of the call is the variable and the unit price (price/min or price/pulse) the value of the function. When a subscriber, before initiation of a call, gives the approximate duration of the call or the control means 11, 12, 21–23, 31–33, 41 and 42 uses the statistical expectation value for the duration of the call, obtained by an optimisation process, the control means 11, 12, 21–23, 31–33, 41 and 42 estimates the total price of the call by calculating the integral from the price data function using the estimated duration of the call. On the basis of the total price the control means 11, 12, 21–23, 31–33, 41 and 42 controls the choice of operator.

The network based solution and data transmission of the invention enable a highly efficient use of teleservices. Let us assume that a subscriber wishes to make a call from Finland to India, and that calls from Finland to USA and from USA to India altogether cost less than a direct call from Finland to India. In this case the subscriber preferably inputs only the telephone number in India into the control means 11, which knows that the call is most inexpensively carried out indirectly via the USA. Hence the control means 11 directs the subscriber to call India via an operator in the USA, not directly through a Finnish operator. This way the most inexpensive Finnish and American operators will be chosen, resulting in less costs than the choice of the most inexpensive Finnish operator alone.

In a solution conforming with the invention it is also possible that the service databases are interconnected as a network through a communications network, and that all information acquired by a service information database is also available to all other service information databases. Data transmission between the service information databases, and the information that is then transferred to the control means do not have to be statistical only, as service information can be expressed and transmitted in a form of a function or a relation, or in any other form. On the basis of the service information transmitted the control means then routes and directs the formation of the connection at the subscriber terminal.

In a solution conforming with the invention it is also possible for the user to input parameters into the control means, such as e.g. the expected duration of the connection or quality requirements for the connection.

Even though the invention has been explained in the above with reference to examples in accordance with the accompanying drawings, it is obvious that the invention is not restricted to them but can be modified within the scope of the inventive idea disclosed in the above and in the attached claims.

What is claimed is:

1. A method for call set-up in a telecommunication system comprising a plurality of subscriber terminals (110), a plurality of service provider means (15 to 17, 25, 26, 35, 45, 46), at least two service database means (10, 20, 30 and 40) for storing service information received from the service provider means, and a telecommunications network via which calls are established in the system, wherein the service database means (10, 20, 30 and 40) are in an updated connection with the service provider means (15 to 17, 25, 26, 35, 45, 46) and store the service information received via the connection, the service information stored in the service database means (10, 20, 30 and 40) is periodically transmitted to a control means (11, 12, 21 to 23, 31 to 33, 41 and 42) in connection with the subscriber terminal (110), each of the control means (11, 12, 21 to 23, 31 to 33, 41 and 42) in connection with the subscriber terminal (110) stores the service information received from the service database means (10, 20, 30 and 40), and the service information stored in the control means (11, 12, 21 to 23, 31 to 33, 41 and 42) is used in controlling call set-up from the subscriber terminal (110), the service database means (10, 20, 30 and 40) form their own respective service areas, so that different service areas comprise a plurality of the service provider means (15 to 17, 25, 26, 35, 45, 46), subscriber terminals (110), and control means (11, 12, 21 to 23, 31 to 33, 41 and 42) in connection with the subscriber terminals (110), and the service database means (10, 20, 30 and 40) are in an undated connection with the service provider means (15 to 17, 25, 26, 35, 45, 46) of its own of the service areas, the service database means (10, 20, 30 and 40) transmit the service information related only to its own of the service areas to the control means (11, 12, 21–23, 31–33, 41 and 42) in connection with the subscriber terminal (110), the service database means (10, 20, 30 and 40) form a network where each of the service database means (10, 20, 30 and 40) shares its own of the service information with the other service database means (10, 20, 30 and 40), and each of the service database means (10, 20, 30 and 40) gathers from the service provider means (15 to 17, 25, 26, 35, 45, 46) the service information concerning the respective one of the service areas of the service database means (10, 20, 30 and 40) or the service going through the one of the service areas.

2. A method for call set-up in a telecommunication system comprising a plurality of subscriber terminals (110), a plurality of service provider means (15 to 17, 25, 26, 35, 45, 46), several service database means (10, 20, 30 and 40) for storing service information received from the service provider means, and a telecommunications network via which calls are established in the system, wherein the service database means (10, 20, 30 and 40) are in an updated connection with the other service database means (10, 20, 30 and 40) and with the service provider means (15 to 17, 25, 26, 35, 45, 46) and store the service information received via the connection, the service information stored in the service database means (10, 15, 20, 30 and 40) is periodically transmitted to a control means (11, 12, 21 to 23, 31 to 33, 41 and 42) in connection with the subscriber terminal (110), and each of the control means (11, 12, 21 to 23, 31 to 33, 41 and 42) in connection with the subscriber terminal (110) stores the service information received from the service database means (10, 20 , 30 and 40 ), and the service information stored by the control means (11, 12, 21 to 23, 31 to 33, 41 and 42) is used in controlling call set-up from the subscriber terminal (110), the service database means (10, 20, 30 and 40) form their own respective service areas, so that different service areas comprise a plurality of the service provider means (15 to 17, 25, 26, 35, 45, 46), subscriber terminals (110), and control means (11, 12, 21 to 23, 31 to 33, 41 and 42) in connection with the subscriber terminals (110), and the service database means (10, 20, 30 and 40) are in an updated connection with the service provider means (15 to 17, 25, 26, 35, 45, 46) of its own of the service areas, the service database means (10, 20, 30 and 40) transmit the service information related only to its own of the service areas to the control means (11, 12, 21–23, 31–33, 41 and 42) in connection with the subscriber terminal (110), the service database means (10, 20, 30 and 40) form a network where each of the service database means (10, 20, 30 and 40) shares its own of the service information with the other service database means (10, 20, 30 and 40), and each of the service database means (10, 20, 30 and 40) gathers from the service provider means (15 to 17, 25, 26, 35, 45, 46) the service information concerning the respective one of the service areas of the service database means (10, 20, 30 and 40) or the service going through the one of the service areas.

3. A method as claimed in claim 1 wherein the service database means (10, 20, 30 and 40) automatically establishes a connection with the control means (11, 12, 21 to 23, 31 to 33, 41 and 42) for the transmission of service information from the service database means (10, 20, 30 and 40) to the control means (11, 12, 21 to 23, 31 to 33, 41 and 42) in connection with the subscriber terminal (110).

4. A method as claimed in claim 1 wherein a connection is established manually from the subscriber terminal (110) to the service database means (10, 20, 30 and 40) for the transmission of service information from the service database means (10, 20, 30 and 40) to the control means (11, 12, 21 to 23, 31 to 33, 41 and 42) in connection with the subscriber terminal (110).

5. A method as claimed in claim 1 wherein the service information used is service price data, and the control means (11, 12, 21 to 23, 31 to 33, 41 and 42) in connection with the subscriber terminal (110) controls the subscriber terminal (110) so that is forms the connection by using the most inexpensive service by showing or preselecting the identification code of the service provider means (15 to 17, 25, 26, 35, 45, 46).

6. A method as claimed in claim 1 wherein information given by a user is stored in the control means (11, 12, 21 to 23, 31 to 33, 41 and 42) and used together with information received from the service database means (10, 20, 30 and 40) in controlling call set-up.

7. A method as claimed in claim 1 wherein if a signal requires certain quality of the connection, and if the service information comprises quality information on the connection, the control means (11, 12, 21 to 23, 31 to 33, 41 and 42) in connection with the subscriber terminal (110) controls call set-up so that the connection to be set up meets the quality requirements.

8. A method as claimed in claim 1 wherein the control means (11, 12, 21 to 23, 31 to 33, 41 and 42) is in connection with a mobile station.

9. A telecommunication system comprising a plurality of subscriber terminals (110), a plurality of service provider means (15 to 17, 25, 26, 35, 45, 46), several service database means (10, 20, 30 and 40), and a telecommunications network via which calls are arranged to be established in the system, wherein the service database means (10, 20, 30 and 40) whose connections with each other form a network, the service database means (10, 20, 30 and 40) being arranged to be in connection with the service provider means (15 to 17, 25, 26, 35, 45, 46), the service database means (10, 20, 30 and 40) being arranged to form their own service areas, so that different service areas comprises a plurality of service provider means (15 to 17, 25, 26, 35, 45, 46), subscriber terminals (110), and control means (11, 12, 21 to 23, 31 to 33, 41 and 42) in connection with the subscriber terminals (110), and the service database means (10, 20, 30 and 40) are in an updated connection with the service provider means (15 to 17, 25, 26, 35, 45, 46) of its own service area, the service database means (10, 20, 30 and 40) being arranged to transmit the service information related only to its (10, 20, 30 and 40) own service area to the control means (11, 12, 21–23, 31–33, 41 and 42) in connection with the subscriber terminal (110), the service database means (10, 20, 30 and 40) being arranged to form a network where each of the service database means (10, 20, 30 and 40) shares its own service information with the other service database means (10, 20, 30 and 40), and each of the service database means (10, 20, 30 and 40) being arranged to gather from the service provider means (15 to 17, 25, 26, 35, 45, 46) the service information concerning the service area of the service database means (10, 20, 30 and 40) or the service going through the said service area, and a control means (11, 12, 21 to 23, 31 to 33, 41 and 42) in connection with the subscriber terminal (110) arranged to be periodically in connection with the service database means (10, 20, 30 and 40) for the transmission of service information, the control means (11, 12, 21 to 23, 31 to 33, 41 and 42) being arranged to control the call set-up of the subscriber terminal (110) on the basis of the service information.

10. A telecommunication system as claimed in claim 9, wherein each of the service database means (10, 20, 30 and 40) is arranged to be in real time connection with the service provider means (15 to 17, 25, 26, 35, 45, 46)

each of the service database means (10, 20, 30 and 40) comprises its own service area with a varying number of service provider means (15 to 17, 25, 26, 35, 45, 46) and both subscriber terminals (110) and thereto connected control means (11, 12, 21 to 23, 31 to 33, 41 and 42), and each of the service database means (10, 20, 30 and 40) is arranged to gather service information from its own service area and to transmit at least part of the service information to the other service database means (10, 20, 30 and 40).

11. A telecommunication system as claimed in claim 9, wherein the service database means (10, 20, 30 and 40) is arranged to automatically establish a connection with the control means (11, 12, 21 to 23, 31 to 33, 41 and 42) in connection with the subscriber terminal (110) and to transmit the service information concerning its own service area.

12. A telecommunication system as claimed in claim 9, wherein the service information comprises service price data, by means of which the control means (11, 12, 21 to 23, 31 to 33, 41 and 42) in connection with the subscriber terminal (110) is arranged to establish the connection using the most inexpensive service by showing or preselecting the identification code of the service provider means (15 to 17, 25, 26, 35, 45, 46).

13. A telecommunication system as claimed in claim 9, wherein the control means (11, 12, 21 to 23, 31 to 33, 41 and 42) is arranged to store information given by a user and used together with the service information received from the service database means (10, 20, 30 and 40) in controlling call set-up.

14. A telecommunication system as claimed in claim 9, wherein if a signal requires certain quality of the connection, and if the service information comprises quality information on the connection, the control means (11, 12, 21 to 23, 31 to 33, 41 and 42) in connection with the subscriber terminal (110) is arranged to control call set-up so that the connection to be set up meets the quality requirements.

15. A telecommunication system as claimed in claim 9, wherein the control means (11, 12, 21 to 23, 31 to 33, 41 and 42) is in connection with a mobile station.

* * * * *